Nov. 21, 1933.  S. B. HASELTINE  1,935,796
FRICTION SHOCK ABSORBING MECHANISM
Filed Oct. 8, 1931
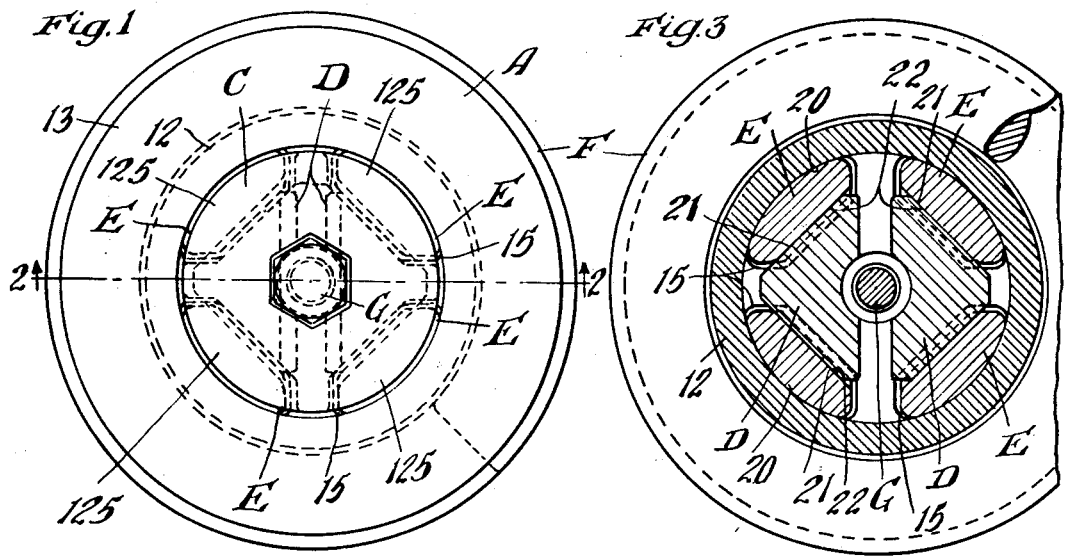
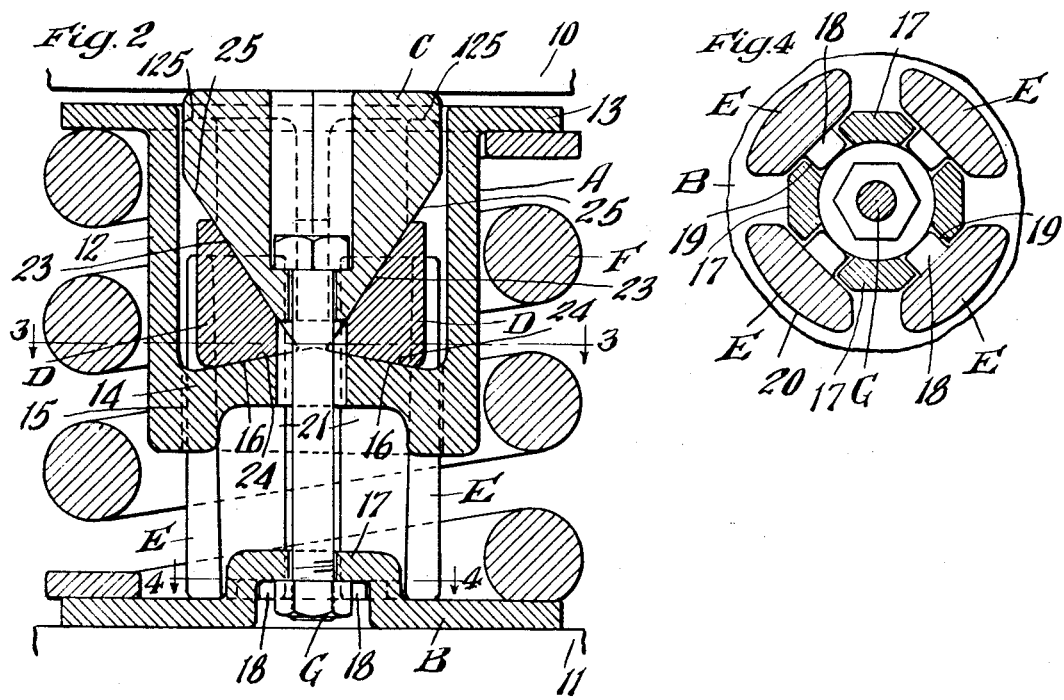
Inventor
Stacy B. Haseltine
Witness
Wm. Geiger
By Henry Fuchs Atty.

Patented Nov. 21, 1933

1,935,796

UNITED STATES PATENT OFFICE 1,935,796

FRICTION SHOCK ABSORBING MECHANISM

Stacy B. Haseltine, Chicago, Ill., assignor to W. H. Miner, Inc., Chicago, Ill., a corporation of Delaware Application October 8, 1931. Serial No. 567,634

6 Claims. (Cl. 267—9)

This invention relates to improvements in friction shock absorbing mechanisms.

One object of the invention is to provide a friction shock absorbing mechanism in the form of a unit adapted for use in connection with railway draft riggings, car trucks, etc., wherein especially high capacity is obtained through the use of a plurality of cooperating friction elements in compact arrangement.

Another object of the invention is to provide a friction shock absorbing unit of the character described in the preceding paragraph, which is particularly designed to replace the usual spring members of tandem spring draft gears, or one or more of the spring elements of railway truck springs, thereby providing greater shock absorbing capacity than is possible through the use of such springs.

A more specific object of the invention is to provide a shock absorbing unit having exceptionally high shock absorbing capacity produced by a plurality of relatively movable friction members, including a friction shell having interior friction surfaces, friction elements or plates having sliding frictional engagement with the shell, and friction shoes having sliding frictional engagement with the plates, wherein wedge means is employed for forcing the shoes, plates, and shell into intimate frictional contact, and relative movement of the shell, plates, and shoes is yieldingly resisted by spring means.

Other objects of the invention will more clearly appear from the description and claims hereinafter following.

In the drawing, forming a part of this specification, Figure 1 is a top plan view of my improved friction unit. Figure 2 is a transverse, vertical sectional view, corresponding substantially to the line 2—2 of Figure 1, and also showing a follower means cooperating with the unit. And Figures 3 and 4 are horizontal sectional views, partly broken away, on the line 3—3 and the line 4—4 respectively of Figure 2.

In said drawing, 10 and 11 indicate follower-acting members, which are movable toward and away from each other, such as the usual end followers of a railway draft rigging, or the co-operating bolster and spring plank members of a car truck. The unit is disposed between the follower-acting members 10 and 11 and is compressed therebetween upon relative approach of said members.

My improved friction shock absorbing unit comprises broadly a friction casing A; a spring follower B; a main wedge C; a pair of friction shoes D—D; four friction elements or plates E—E—E—E; a spring resistance F; and a retaining element G.

The friction shell A is in the form of a spring follower, comprising a tubular section 12 which forms the friction shell and an annular flange 13 at the outer end of the tubular section on which the corresponding end of the spring resistance F bears. At the inner end, the tubular section is provided with a transverse end wall 14 having a plurality of openings 15—15 therethrough. The openings are preferably four in number and arranged symmetrically about the axis of the mechanism, said openings loosely accommodating the plates or friction elements E—E for movement lengthwise of the mechanism. As most clearly shown in Figure 2, the end wall 14 of the friction shell A is provided with a pair of interior, relatively blunt wedge faces 16—16, which form abutment means for the inner ends of the friction shoes D—D. The interior of the tubular section 12 presents a cylindrical wall providing a friction surface with which the friction elements E—E are adapted to cooperate.

The follower B is in the form of a disc member having an inwardly projecting central hollow boss 17, which serves as anchoring means for the friction elements E—E.

The spring resistance F surrounds the friction shell A and has its upper end bearing on the flange 13 of the shell and its lower end bearing on the spring follower disc B.

The four friction plates or elements E—E—E—E are of the cross-sectional shape illustrated in Figures 3 and 4. Each friction element E is seated on the spring follower B and has an inwardly projecting lug 18 at the lower end thereof, which is anchored in a recess 19 provided at the corresponding side of the hollow boss 17 of the spring follower disc B. As will be evident, the four friction elements E—E are thus anchored to the spring follower B for movement therewith. The plates or elements E—E extend through the openings 15—15 of the end wall of the friction shell A and into the shell. On the outer side, each element E is provided with a transversely curved friction surface 20, which cooperates with the cylindrical friction surface of the shell A. On the inner side, each friction element is provided with a flat friction surface 21, which is inclined slightly with respect to the longitudinal axis of the mechanism and cooperates with one of the friction shoes D, as hereinafter pointed out.

The friction shoes D—D are disposed between the elements E—E and each shoe cooperates with two of said elements. Each shoe is of the transverse cross-section illustrated in Figure 3, having a pair of friction surfaces 22—22 on the outer side thereof, which engage respectively with the friction surfaces 21—21 of two adjacent friction elements E—E. On the inner side, each shoe is provided with a wedge face 23, which is disposed at a relatively sharp angle with respect to the longitudinal axis of the mechanism. The bottom end of each shoe is slightly inclined, as shown at 24, so as to cooperate with the blunt wedge face 16 at the corresponding side of the end wall of the friction shell A.

The wedge block C has a pair of wedge faces 25—25 at the inner end thereof, which engage respectively with the wedge faces 23—23 of the two friction shoes D—D. At the outer end, the block C has a laterally projecting annular flange 125, which overhangs the ends of the elements E—E. The wedge block C is of such a size that it projects outwardly of the friction shell A. As will be evident, the wedge block C bears directly on the follower 10, thereby maintaining the flange 13 of the friction shell A spaced from said follower-acting member.

The mechanism is held assembled and of uniform overall length by the retainer bolt G, which has the bottom end thereof anchored to the hollow boss 17 of the spring follower B and the upper end anchored to the wedge block C.

In the operation of my improved friction shock absorbing unit, the parts will be compressed between the follower-acting members 10 and 11 upon relative approach of these members. Movement of the followers 10 and 11 toward each other effects movement of the wedge block C and the spring follower B relatively toward each other. Inasmuch as the wedge block C is in wedging engagement with the two friction shoes D—D, the latter will be wedged apart into tight frictional contact with the friction elements E—E and forced to slide lengthwise of said elements. As the inner ends of the shoes D—D have shouldered engagement on the end wall of the friction shell A, the shell will be forced toward the spring follower B, thereby compressing the spring resistance F. Due to the relative movement of the spring follower B and the shell A, the shell will move relatively to the friction elements E—E, thus providing additional frictional resistance between these members. Compression of the mechanism is limited by engagement of the flange 125 of the wedge C with the upper ends of the friction elements E—E, thereby relieving the spring F from being unduly compressed and going solid.

Release of the mechanism, when the actuating force is reduced, is effected by the expansive action of the spring resistance F, which forces the spring follower B and friction shell A apart. During the separation of the spring follower B and the friction shell A, the wedge C and the friction shoes D—D will be moved outwardly with the shell A while the friction plates or elements E—E are held against movement with respect to the follower B. The parts will thus be restored to the full release position illustrated in Figure 2, movement of the wedge being limited by the retainer bolt G, thus arresting movement of the friction wedge shoes D—D and the friction shell A.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior friction surfaces, said shell having spring abutment means thereon; of a plurality of friction elements extending lengthwise of the mechanism and having frictional engagement with the interior friction surfaces of the shell; a follower, said elements being movable with respect to said follower, and said elements and shell being movable with respect to each other lengthwise of the mechanism; spring means bearing at one end on said spring abutment means of the shell and yieldingly opposing relative movement of said follower and shell; wedge friction shoes having frictional engagement with said elements and shouldered engagement with the shell; a wedge block having wedging engagement with the friction shoes; and a second follower bearing on said wedge and spaced from said shell, said followers being movable toward and away from each other.

2. In a friction shock absorbing mechanism, the combination with a follower; of a friction shell having interior friction surfaces; a plurality of friction elements extending lengthwise of the mechanism and having frictional engagement with the interior friction surfaces of the shell; a second follower, said followers being movable toward and away from each other, and said friction shell being spaced from both followers, said elements being movable in unison with said second named follower and also movable with respect to the shell lengthwise of the mechanism; spring means yieldingly opposing relative movement of said second named follower and shell; wedge friction shoes, each having frictional engagement with two of said elements and shouldered engagement with the shell; and a wedge block engaged and actuated by the first named follower and having wedging engagement with the friction shoes to force said shoes against the shell and effect movement of the shell toward the second named follower.

3. In a friction shock absorbing mechanism, the combination with a friction shell having interior friction surfaces extending lengthwise thereof, said shell also having wedge faces at the inner end; of a plurality of friction elements extending lengthwise of the mechanism and having frictional engagement with the friction surfaces of the shell, said elements and shell being movable with respect to each other lengthwise of the mechanism; spring follower means movable with said elements; spring means yieldingly opposing relative movement of said spring follower means and shell; wedge friction shoes having frictional engagement with said elements and wedging engagement with the wedge faces of the shell to force said shell to move toward said spring follower means during compression of the mechanism; and a wedge block receiving the actuating force, said block being movable toward said spring follower means during a compression stroke of said block and having wedging engagement with the shoes.

4. In a friction shock absorbing mechanism, the combination with a friction shell having interior friction surfaces extending lengthwise thereof, said shell also having wedge faces at the inner end; of a plurality of friction elements extending lengthwise of the mechanism and having frictional engagement with the friction surfaces of the shell, said elements and shell being movable with respect to each other lengthwise of the mechanism; spring means surrounding the shell and yieldingly opposing relative movement of said elements and shell; wedge friction shoes between said elements having frictional engagement with said elements and wedging engagement with the wedge faces of the shell; and a wedge block receiving the actuating force and being movable inwardly of the friction shell during compression of the mechanism, said block engaging between said shoes and having wedging engagement with the same, said wedge block projecting outwardly of the shell.

5. In a friction shock absorbing mechanism, the combination with a friction shell having a lateral flange at the outer end, said shell having interior, longitudinally disposed friction surfaces, and an inner end wall; of a plurality of friction elements extending through said inner end wall and having sliding frictional contact with the friction surfaces of the shell; a follower member anchored to the outer ends of said friction elements; a spring resistance surrounding said shell and having its opposite ends bearing respectively on said follower member and flange of the shell; friction wedge shoes disposed within the shell and having sliding frictional engagement with the friction elements and shouldered engagement with the end wall of the shell; and a wedge block having wedging engagement with the shoes, said block projecting outwardly of the shell to receive the actuating force.

6. In a friction shock absorbing mechanism, the combination with a friction shell having interior friction surfaces; of a plurality of longitudinally tapered friction elements extending lengthwise of the mechanism and having frictional engagement with the interior friction surfaces of the shell, said elements and shell being movable with respect to each other lengthwise of the mechanism; spring resistance means yieldingly opposing relative movement of said elements and shell; wedge friction shoes having sliding frictional engagement with said tapered elements and shouldered engagement at their inner ends with the shell; a wedge block having wedging engagement with the friction shoes, said block having shouldered engagement with the outer ends of said elements to limit the compression of the mechanism, said block projecting outwardly of the shell and receiving the actuating force; and means for limiting the expansion of the mechanism and holding the same assembled with the wedge projecting outwardly of the friction shell.

STACY B. HASELTINE.